(12) United States Patent
Javelot et al.

(10) Patent No.: US 9,476,690 B2
(45) Date of Patent: Oct. 25, 2016

(54) METHOD FOR CONTROLLING THE CLEARANCE AT THE TIPS OF BLADES OF A TURBINE ROTOR

(75) Inventors: Christophe Javelot, Vitry sur Seine (FR); Damien Bonneau, Melun (FR); Bruno Robert Gaully, Marolles en Hurepoix (FR); Amaury Olivier, Boulogne-Billancourt (FR)

(73) Assignee: SNECMA, Paris (FR)

( * ) Notice: Subject to any disclaimer, the term of this patent is extended or adjusted under 35 U.S.C. 154(b) by 579 days.

(21) Appl. No.: 13/984,979

(22) PCT Filed: Feb. 2, 2012

(86) PCT No.: PCT/FR2012/050232
§ 371 (c)(1),
(2), (4) Date: Aug. 12, 2013

(87) PCT Pub. No.: WO2012/107670
PCT Pub. Date: Aug. 16, 2012

(65) Prior Publication Data
US 2013/0323016 A1   Dec. 5, 2013

(30) Foreign Application Priority Data

Feb. 11, 2011 (FR) ...................................... 11 51145

(51) Int. Cl.
*F01D 11/24* (2006.01)
*G01B 7/14* (2006.01)

(52) U.S. Cl.
CPC .................. *G01B 7/14* (2013.01); *F01D 11/24* (2013.01); *F05D 2260/85* (2013.01); *F05D 2270/303* (2013.01)

(58) Field of Classification Search
CPC ..... F01D 11/24; G01B 7/14; F05D 2260/85; F05D 2270/303
USPC ........................................... 415/1, 116, 173.2
See application file for complete search history.

(56) References Cited

U.S. PATENT DOCUMENTS

| 4,710,095 A | 12/1987 | Freberg et al. |
| 6,487,491 B1 | 11/2002 | Karpman et al. |
| 2006/0051197 A1 | 3/2006 | Regunath |
| 2008/0069683 A1 | 3/2008 | Nigmatulin et al. |
| 2010/0218506 A1 | 9/2010 | Nigmatulin et al. |
| 2010/0303612 A1* | 12/2010 | Bhatnagar ............... F01D 11/22 415/127 |
| 2011/0027068 A1* | 2/2011 | Floyd, II ................. F01D 11/24 415/13 |

FOREIGN PATENT DOCUMENTS

| GB | 2 417 762 | 3/2006 |
| JP | 2008-215184 A | 9/2008 |

OTHER PUBLICATIONS

International Search Report Issued Mar. 30, 2012 in PCT/FR12/050232 Filed Feb. 2, 2012.

* cited by examiner

*Primary Examiner* — Audrey K Bradley
*Assistant Examiner* — Dapinder Singh
(74) *Attorney, Agent, or Firm* — Oblon, McClelland, Maier & Neustadt, L.L.P.

(57) ABSTRACT

A method controlling a clearance between tips of blades of a turbine rotor of a gas turbine aircraft engine and a ring-shaped turbine shroud of a housing surrounding the blades, the method including: controlling flow and/or temperature of air directed toward the housing according to an estimate of the clearance, the estimate of the clearance is determined upon start-up of the aircraft engine, according to a temperature measured by a temperature sensor including a sensitive element positioned in a free space of the aircraft engine.

7 Claims, 3 Drawing Sheets

METHOD FOR CONTROLLING THE CLEARANCE AT THE TIPS OF BLADES OF A TURBINE ROTOR

BACKGROUND OF THE INVENTION

The present invention relates to the general field of turbomachinery for aeronautical gas turbine engines. It is more specifically directed to the control of the clearance between the tips of mobile blades of a turbine rotor on the one hand, and a ring-shaped turbine shroud of an external housing surrounding the blades.

The existing clearance between the tip of the blades of a turbine and the ring-shaped shroud which surrounds them depends on the differences in dimensional variations between the rotating portions (disc and blades forming the turbine rotor) and fixed portions (external housing including the ring-shaped turbine shroud which it comprises). These dimensional variations have both a thermal origin (related to temperature variations of the blades, of the disc and of the housing) and a mechanical origin (notably related to the effect of the centrifugal force exerted on the turbine rotor).

In order to increase the performance of the turbine, it is desirable to minimize the clearance as much as possible. On the other hand, during an increase in speed, for example when passing from idling speed on the ground to take-off speed in a turbomachine for an aircraft engine, the centrifugal force exerted on the turbine rotor tends to bring the tips of blades closer to the ring-shaped turbine shroud before the ring-shaped turbine shroud has had time to expand under the effect of the increase in temperature related to the increase in speed. Therefore, there exists a contact risk in this operating point called a nipping point.

Resorting to active control systems is known for controlling the clearance of blade tips of a turbomachinery turbine. These systems generally operate by directing onto the outer surface of the ring-shaped turbine shroud, air for example taken up at a compressor and/or at the fan of the turbine engine. Fresh air sent over the outer surface of the turbine shroud has the effect of cooling the latter and thereby limiting its thermal expansion. Clearance is therefore minimized. Conversely, hot air promotes thermal expansion of the ring-shaped turbine shroud, which increases the clearance and for example gives the possibility of avoiding contact at the aforementioned nipping point.

Such an active control is controlled for example by the full authority digital engine control (or FADEC) system of the turbine engine. More specifically, the flow rate and/or the temperature of the air directed onto the ring-shaped turbine shroud is controlled depending on a set clearance and on an estimation of the actual blade tip clearance. Indeed, no sensor directly measures the blade tip clearance, which has therefore to be estimated.

As explained earlier, the blade tip clearance notably depends on the thermal state of the turbine engine. It is therefore known how to determine an estimation of the blade tip clearance, upon starting a turbine engine, depending on the thermal state of the turbine engine.

In certain engines, the thermal state upon starting is estimated according to the stoppage time of the engine. Recording the stoppage time of the engine is however a complex operation.

In certain engines, the turbine is equipped with a temperature sensor measuring the temperature of the housing, called $T_{case}$. These are typically mass thermocouples (i.e. measuring the temperature of the material and not of the ambient air) of the K (chromel-alumel) type with a spring for compensating for the differential expansions and the vibrations. Such a sensor however has high cost, high mass and great bulkiness. Its installation at the housing, with its harness, is complex. Further, a loss of contact between the housing and the thermocouple may distort the measurement of the temperature.

OBJECT AND SUMMARY OF THE INVENTION

The main object of the present invention is therefore to overcome such drawbacks.

This object is achieved by a method for controlling clearance between blade tips of a turbine rotor of a gas turbine aircraft engine on the one hand and a ring-shaped turbine shroud of a housing surrounding the blades on the other hand, the method consisting of controlling flow rate and/or temperature of air directed towards the housing notably depending on an estimation of said clearance, characterized in that said estimation of said clearance is determined, upon starting the aircraft engine, according to a temperature measured by a temperature sensor including a sensitive element laid out in a free space of the aircraft engine.

If, upon starting the engine, no airflow crosses the free space, then the temperature measured by the sensitive element of the temperature sensor is the temperature of its environment, as measured through radiation. The time-dependent change of this temperature during the standstill of the engine on the ground may be reproducible and is able to be modeled.

Thus, by knowing the temperature measured during the starting of the engine, it is possible to determine the stoppage period of the engine without requiring recording of the stoppage time of the engine. A complex recording operation is therefore avoided. Further, the thermal state of the engine upon starting may be determined without requiring a temperature sensor of the mass thermocouple type.

More generally, the invention gives the possibility of determining an estimation of the clearance upon starting the engine, while benefiting from the reproducibility of the time-dependent change in the temperature during the standstill of the engine on the ground, without requiring recording of the stopping time of the engine or any temperature sensor of the mass thermocouple type.

On the other hand, in an embodiment, the temperature sensor is a sensor intended to operate by suction after starting the aircraft engine, in order to measure the temperature of an airflow in a vein of the aircraft engine.

Thus, the temperature sensor may be mutualized among several functions.

According to an embodiment, the control method comprises:
  a step for determining a stoppage period of the aircraft engine depending on said temperature and on a model of the time-dependent change in said temperature over time during the standstill of the aircraft engine on the ground,
  a step for determining a thermal state of the aircraft engine upon starting, depending on the determined stoppage period, and
  a step for determining said estimation of the clearance according to the determined thermal state.

The determination of a thermal state of the aircraft engine upon starting depending on a stoppage period, and the determination of an estimation of the clearance depending on the determined thermal state, are known and controlled operations. With the step for determining a stoppage period of the aircraft engine depending on said temperature and on a model of the time-dependent change in said temperature over time during standstill of the aircraft engine on the ground, it is therefore possible to benefit from these known operations.

Correlatively, the invention proposes a control unit intended for controlling clearance between tips of blades of a turbine rotor of a gas turbine aircraft engine on the one hand and, a ring-shaped turbine shroud of a housing surrounding the blades, said control unit comprising a module for controlling flow rate and/or temperature of air directed towards the housing notably depending on an estimation of said clearance, characterized in that it comprises an estimation module capable of determining said estimation of said clearance, upon starting the aircraft engine, depending on a temperature measured by a temperature sensor including a sensitive element laid out in a free space of the aircraft engine.

The invention also proposes an aircraft engine comprising a control unit according to the invention and a temperature sensor including a sensitive element laid out in a free space of the aircraft engine, said temperature sensor being intended to operate by suction after starting the aircraft engine, in order to measure the temperature of an airflow in a vein of the aircraft engine, the estimation module of the control unit being able to determine said estimation of said clearance according to the temperature measured by said temperature sensor.

The advantages and features discussed earlier in connection with the control method are also applied to the control unit and to the engine according to the invention.

SHORT DESCRIPTION OF THE DRAWINGS

Other features and advantages of the present invention will become apparent from the description made below, with reference to the appended drawings which illustrate an exemplary embodiment thereof without any limitation. In these figures.

DETAILED DESCRIPTION OF EMBODIMENTS

Figure 1:
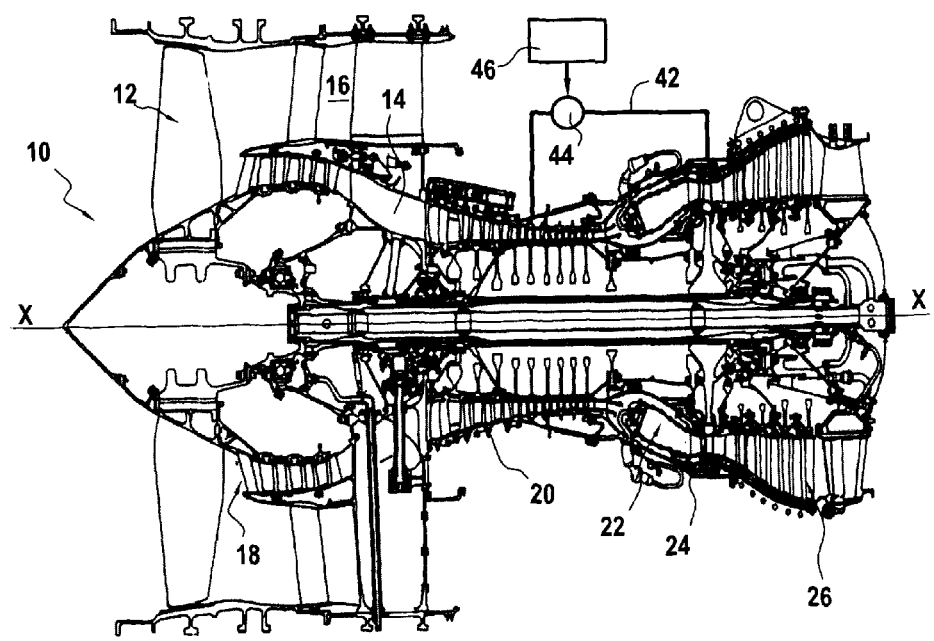
FIG. 1 is a schematic and longitudinal sectional view of a portion of a gas turbine aircraft engine according to an embodiment of the invention.

FIG. 1 schematically illustrates a turbojet engine 10 of the dual flow and dual body type to which the invention applies in particular. Of course, the invention is not limited to this particular type of a gas turbine aircraft engine.

In a well-known way, the turbojet engine 10 with a longitudinal axis X-X notably comprises a fan 12 which delivers an airflow in a vein of of a primary flow 14 stream and in a vein of a secondary flow 16 stream coaxial with the primary flow vein. From upstream to downstream in the direction of the stream of the gas flow crossing it, the vein of a primary flow 14 stream comprises a low pressure compressor 18, a high pressure compressor 20, a combustion chamber 22, a high pressure turbine 24 and a low pressure turbine 26.

Figure 2:
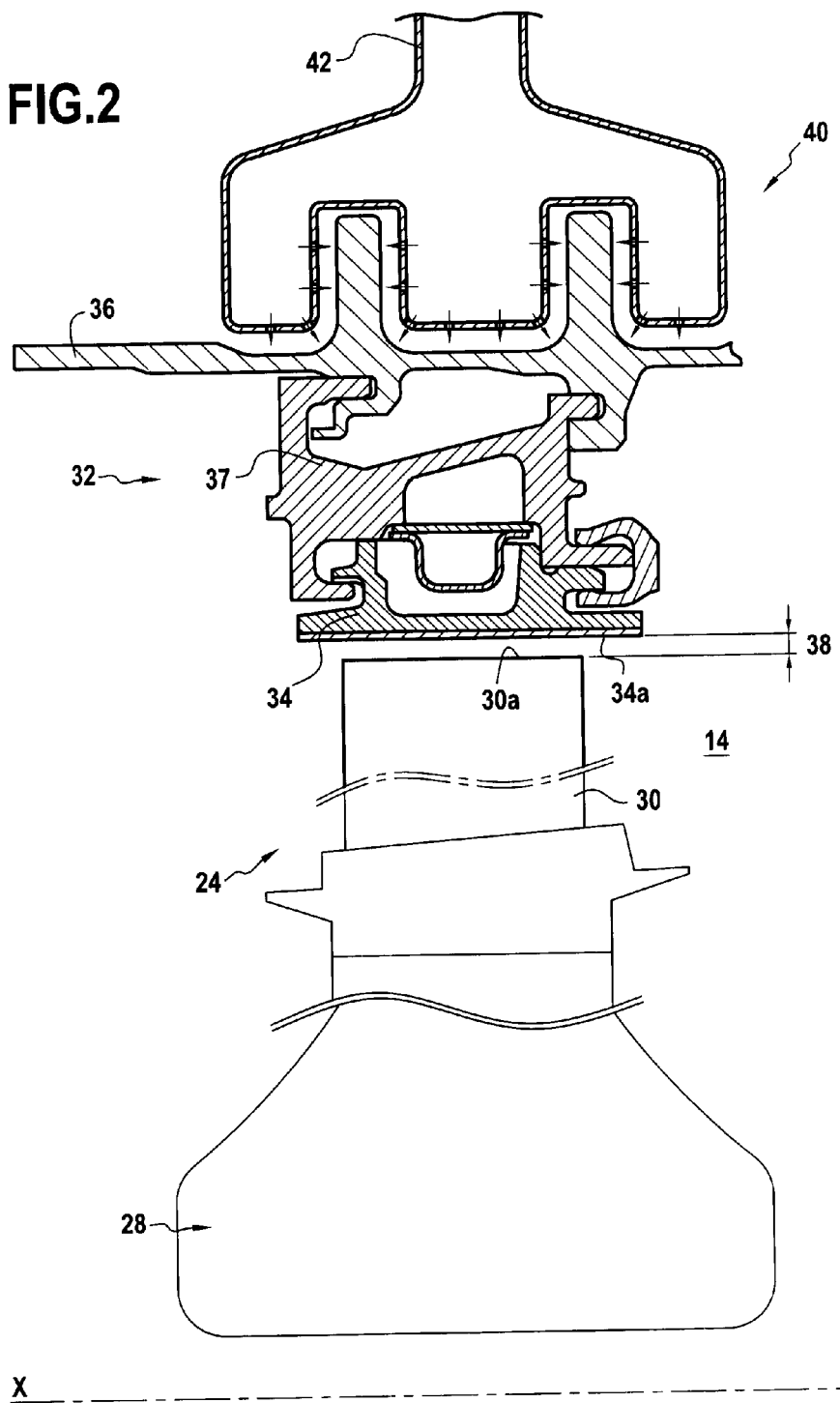
FIG. 2 is an enlarged view of the engine of FIG. 1 notably showing the high pressure turbine of the latter.

As illustrated more specifically in FIG. 2, the high pressure turbine 24 of the turbojet engine comprises a rotor formed with a disc 28 on which are mounted a plurality of mobile blades 30 positioned in the vein of the primary flow 14 stream. The rotor is surrounded by a turbine housing 32 comprising a ring-shaped turbine shroud 34 borne by an external turbine housing 36 via attachment spacers 37.

The ring-shaped turbine shroud 34 may be formed with a plurality of adjacent sectors or segments. On the internal side, it is provided with a layer 34a of abradable material and surrounds the blades 30 of the rotor while providing clearance 38 with the tips 30a of the latter.

According to the invention, a system is provided allowing control of the clearance 38 by modifying the internal diameter of the external turbine housing 36 in a controlled way. For this purpose, a control unit 46 controls the flow rate and/or temperature of the air directed towards the external turbine housing 36, depending on an estimation of the clearance 38 and on a set clearance. The control unit 46 is for example the full authority digital engine control (or FADEC) system of the turbojet engine 10.

For this purpose, in the illustrated example, a control casing 40 is positioned around the external housing 36. This casing receives fresh air by means of an air conduit 42 opening at its upstream end into the vein of the primary flow stream at one of the stages of the high pressure compressor 20 (for example by means of a scoop known per se and not illustrated in the figures). The fresh air circulating in the air conduit is discharged into the external turbine housing 36 (for example by multiperforation of the walls of the control casing 40) causing cooling of the latter and therefore a reduction in its internal diameter. As illustrated in FIG. 1, a valve 44 is positioned in the air conduit 42. This valve is controlled by the control unit 46.

Of course, the invention is not limited to this particular type of control of the dimensions of the housing. Thus, another example not shown consists of taking up air at two different stages of the compressor and of modulating the flow rate of each of these samples for adjusting the temperature of the mixture to be directed onto the external turbine housing 36.

The determination of an estimation of the clearance 38, noted as 3, with the control unit 46 is now described.

In a known way, the control unit 46 obtains measurement signals from different sensors laid out in the turbojet engine 10, and in particular:

the outside temperature T12, and the temperature T495 measured by a temperature sensor 1 intended to measure the temperature in the vein of the primary flow 14 stream, at the low pressure turbine 26.

Figure 3:
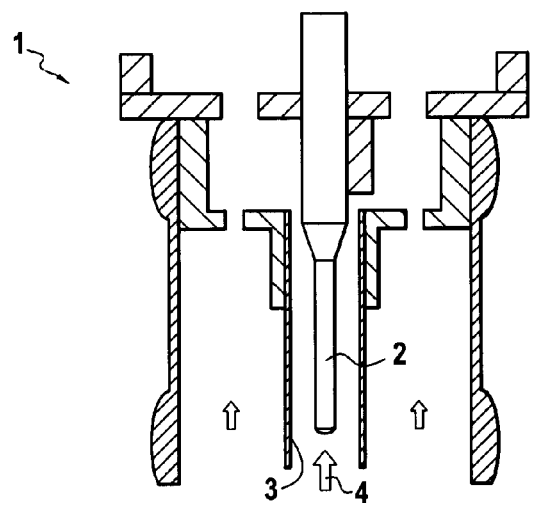
FIG. 3 illustrates a temperature sensor of the engine of FIG. 1.

FIG. 3 schematically illustrates the temperature sensor 1 allowing measurement of the temperature T495. The temperature sensor 1 comprises a sensitive element 2 located in a free space 3 crossed, during operation, by an air flow symbolized by an arrow 4.

The operation of such a sensor is known to one skilled in the art and will not be described in detail. It is sufficient to recall that this type of sensor operates by suction from a certain pressure difference between the upstream area and the downstream area. Ideally, the temperature sensor 1 operates in sonic mode, for a given pressure ratio, in order to guarantee constant flow rate at the sensitive end 2. Thus, starting with the idle speed on the ground, the temperature T495 measured by the sensitive element 2 of the temperature sensor 1 is therefore the temperature of the air flow.

However, for engine speeds below the idle speed on the ground or on standstill of the engine, no airflow crosses the free space 3. Thus, in this case, the temperature T495 measured by the sensitive element 2 of the temperature sensor 1 is the temperature of its environment, as measured through radiation.

The inventors have noticed that the time-dependent change of the temperature T495 during the standstill of the engine on the ground was reproducible and deterministic. This observation is used for estimating the clearance 38 upon starting the turbojet engine 10.

More specifically, the inventors studied the following quantity $\Delta T(t)$:

$$\Delta T(t) = \frac{T495(t) - T12(t)}{T495(0) - T12(0)}$$

wherein t represents time, the reference t=0 corresponds to a reference time following the stopping of the engine, for example 150 seconds after stopping the engine.

The inventors noticed that the quantity $\Delta T(t)$ was able to be modeled in the following way:

$$\Delta T(t) = \frac{1}{2} * (e^{-\frac{t}{\tau 1}} + e^{-\frac{t}{\tau 2}})$$

wherein $\tau 1$ and $\tau 2$ are time constants.

The time constants $\tau 1$ and $\tau 2$ may be determined empirically, from tests conducted on the turbojet engine 10 or on one or several turbojet engines of the same type. The initial temperature T495(0) may be different from one test to the other. During tests conducted on a particular engine, the inventors determined the following time constants: $\tau 1$=758 s and $\tau 2$=5450 s.

Knowing the value of the time constants $\tau 1$ and $\tau 2$, it is then possible to determine, upon starting the engine at instant t, the stoppage period of the engine, i.e. determine the value of t, according to the temperatures T495(0), T12(0), T495(t) and T12(t). The temperatures T495(0) and T12(0) may be stored in memory by the control unit 46 upon stopping the engine.

Figure 4:
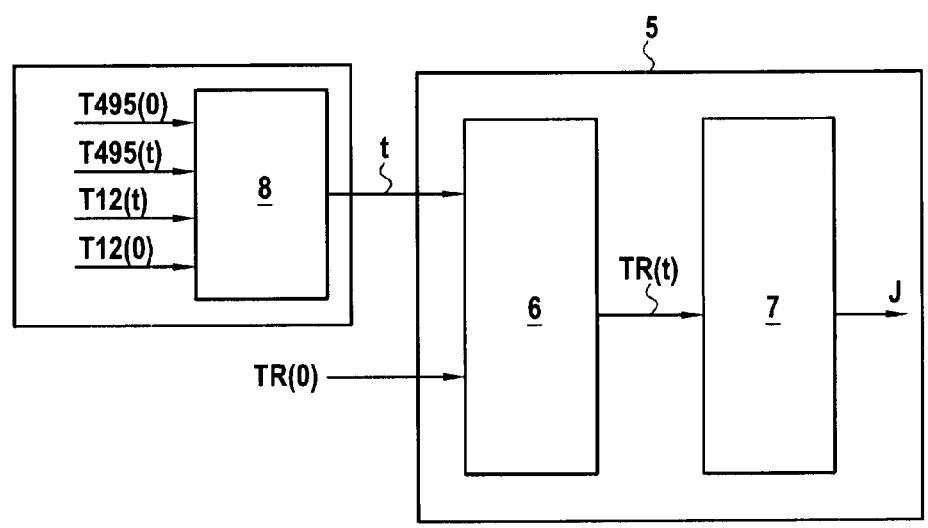
FIG. 4 illustrates as functional modules, certain steps of a control method according to an embodiment of the invention.

FIG. 4 illustrates the determination of an estimation J of the clearance 38 upon starting the engine, in the form of functional modules. These functional modules for example, correspond to a computer program executed by the control unit 46.

In FIG. 4, a determination module 5 determines the estimation J according to the stoppage period of the engine, represented by t, and to the temperature of the rotor, noted as TR, upon stopping the rotor: TR(0). The determination module 5 comprises two modeling modules 6 and 7.

The modeling modules 6 implements a thermal model for the time-dependent change in the temperature of the rotor TR over time, and therefore provides an estimation of the temperature of the rotor TR(t) according to TR(0) and t.

The modeling module 7 implements a thermal model of the turbojet engine 10 and determines the estimation 3 of the clearance 38 versus the temperature TR(t).

Producing the modeling modules 6 and 7 belongs to the general knowledge of one skilled in the art and will therefore not be described in detail. For example, a thermal model of the change in the temperature of the rotor TR versus time may be a model of the first order with a time constant of 8/3 hours.

After the starting of the engine, for example at a cruising speed, another determination module (not shown) is loaded in order to determine the estimation of the clearance 38. This other module also involves determination of the temperature TR of the rotor. The temperature TR determined by this other determination module during the stopping of the engine may be stored in memory by the control unit 46 and be used by the determination module 5 as an input datum for the temperature TR(0).

The stoppage period, represented by the time t, is determined by a modeling module 8 which implements a model of the time-dependent change in the temperature T495 during the stopping of the engine on the ground, according to the aforementioned equation. Thus, the modeling module 8 determines the time t versus the temperatures T495(0), T12(0), T495(t) and T12(t).

By means of the modeling module 8, it is possible to determine the stoppage period of the engine without requiring the recording of the stopping time of the engine. A complex recording operation is therefore avoided. Further, the thermal state of the engine upon starting, represented here by TR(t), may be determined without requiring any temperature sensor of the mass thermocouple type.

In the diagram of FIG. 4, an overestimation of the stoppage period leads to an underestimation of the temperature of the rotor TR(t) upon starting, and therefore to an overestimation of the clearance 38 upon starting. An overestimation of the clearance 38 upon starting is expressed by an overestimation of the clearance 38 being regulated, which may cause contact and damaging of the blades 30.

As the accuracy of the clearance 38 is 0.03 mm, an overestimation of the clearance 38 by 0.03 mm is the acceptable limit. Within the scope of the study of its particular engine and of a particular regulation mode, the inventors have determined that an overestimation of the clearance 38 by 0.03 mm corresponds to an underestimation of the temperature of the rotor upon starting TR(t) by about 60K.

For the aforementioned models of the time-dependent change in the temperature of the rotor TR and of the time-dependent change in the temperature T495 during the stopping of the engine on the ground versus time, and the aforementioned constant values, this corresponds to an overestimation by 860 seconds (i.e. more than 14 minutes) of the stoppage period.

By comparing the actual stoppage period with the stoppage period estimated by the model of the time-dependent change in the temperature T495, the inventors noticed that the model of the time-dependent change in the temperature T495 gave the possibility of estimating the stoppage period of the engine with sufficient accuracy.

Figure 5:
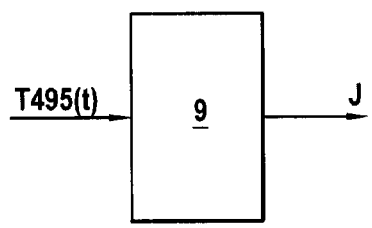
FIG. 5 illustrates, as a functional module, a step of a control method according to another embodiment of the invention.

FIG. 5 illustrates an alternative way for determining an estimation J of the clearance 38 upon starting the engine, while benefiting from the reproducibility of the time-dependent change in the temperature T495 during the standstill of the engine on the ground.

In this alternative, a determination module 9 implements a correspondence table, for example achieved empirically from tests, which directly provides an estimation J of the clearance 38 versus the temperature T495(t).

The invention was described above with reference to the temperature T495. However, another temperature T may be used for determining the stoppage period of the engine and the estimation 3 of the clearance 38. Indeed, the turbojet engine 10 comprises other temperature sensors including a sensitive element located in a free space of the turbojet engine and intended to measure the temperature of an air flow during operation of the turbojet engine 10. At a standstill or below the idle speed, if no airflow circulates in the free space, the sensitive element measures the temperature T of its environment. The time-dependent change in this temperature T over time during the standstill of the engine on the ground may be modeled, in a similar way to what was described above for the temperature T495.

The model for the time dependent change in the temperature T495 described above is normalized by the outer temperature T12. Alternatively another temperature reflecting the outer conditions may be used for normalizing the temperature T495.

The invention claimed is:

1. A method for controlling clearance between tips of blades of a turbine rotor of a gas turbine aircraft engine and a ring-shaped turbine shroud of a housing surrounding the blades, the method comprising:
measuring a temperature using a temperature sensor including a sensitive element laid out in a free space of the aircraft engine during standstill of the aircraft engine on the ground;
estimating the clearance based on the measured temperature during the standstill of the aircraft engine on the ground; and
controlling at least one of a flow rate and a temperature of air directed towards the housing according to the estimated clearance based on the measured temperature,
wherein the standstill is a state of the aircraft engine on the ground in which the aircraft engine is started following a stoppage period of the aircraft engine.

2. The method according to claim 1, further comprising:
determining the stoppage period of the aircraft engine according to the measured temperature and a model of time dependent change of the temperature over time during the standstill of the aircraft engine on the ground;
determining a thermal state of the aircraft engine upon starting, to based on the determined stoppage period; and
estimating the clearance based on the determined thermal state.

3. The method according to claim 1, wherein the temperature sensor is a sensor configured to measure by suction temperature of an airflow in a vein of the aircraft engine.

4. The method according to claim 3, wherein the temperature sensor measures the temperature of the airflow at a low pressure turbine of the aircraft engine.

5. A control unit configured to control clearance between tips of blades of a turbine rotor of a gas turbine aircraft engine and a ring-shaped turbine shroud of a housing surrounding the blades, the control unit comprising:
a module for measuring a temperature using a temperature sensor including a sensitive element laid out in a free space of the aircraft engine during standstill of the aircraft engine on the ground;
a module for estimating the clearance based on the measured temperature during the standstill of the aircraft engine on the ground; and
a module for controlling at least one of a flow rate and a temperature of air directed towards the housing according to the estimated clearance based on the measured temperature,
wherein the standstill is a state of the aircraft engine on the ground in which the aircraft engine is started following a stoppage period of the aircraft engine.

6. An aircraft engine comprising:
a control unit according to claim 5; and
a temperature sensor including a sensitive element laid out in a free space of the aircraft engine, the temperature sensor configured to measure by suction temperature of an airflow in a vein of the aircraft engine, the estimation module of the control unit configured to determine the estimated clearance based on the temperature measured by the temperature sensor.

7. The aircraft engine according to claim 6, wherein the temperature sensor measures the temperature of the airflow at a low pressure turbine of the aircraft engine.

* * * * *